United States Patent
Nakagawa et al.

(10) Patent No.: US 11,543,563 B2
(45) Date of Patent: Jan. 3, 2023

(54) OPTICAL FUNCTIONAL RESIN PANEL HAVING LAYERS OF INCREASING SURFACE HARDNESS

(71) Applicant: Panasonic Intellectual Property Management Co., Ltd., Osaka (JP)

(72) Inventors: Takashi Nakagawa, Osaka (JP); Takayuki Nagahara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 203 days.

(21) Appl. No.: 17/112,962

(22) Filed: Dec. 4, 2020

(65) Prior Publication Data
US 2021/0190994 A1    Jun. 24, 2021

(30) Foreign Application Priority Data
Dec. 24, 2019   (JP) .............................. JP2019-232877

(51) Int. Cl.
*G02B 1/115*   (2015.01)
*G02B 1/14*   (2015.01)
*G02B 5/20*   (2006.01)

(52) U.S. Cl.
CPC ................ *G02B 1/14* (2015.01); *G02B 1/115* (2013.01); *G02B 5/208* (2013.01); *G02F 2201/38* (2013.01); *G02F 2201/50* (2013.01)

(58) Field of Classification Search
CPC . G02B 1/11–118; G02B 1/14; G02F 2201/38; G02F 2201/50
See application file for complete search history.

(56) References Cited

U.S. PATENT DOCUMENTS
2017/0254936 A1   9/2017   Morita

FOREIGN PATENT DOCUMENTS

| | | |
|---|---|---|
| JP | 2006-048026 | 2/2006 |
| JP | 2006-240034 | 9/2006 |
| JP | 2010-181727 | 8/2010 |
| JP | 2016-020049 | 2/2016 |
| JP | 2019-091071 | 6/2019 |
| WO | 2016/027733 | 2/2016 |
| WO | WO-2019035398 A1 * | 2/2019 ............. B32B 27/30 |

OTHER PUBLICATIONS

English translation of WIPO PCT Publication WO 2019/035398 A1, published Feb. 21, 2019 (Kanke et al.), retrieved from https://worldwide.espacenet.com/ on Oct. 17, 2022 (Year: 2019).*

* cited by examiner

Primary Examiner — Ryan S Dunning
(74) Attorney, Agent, or Firm — Wenderoth, Lind & Ponack, L.L.P.

(57) ABSTRACT

An optical functional resin panel includes an injection molding resin, a base film, an ultraviolet curable hard coat layer provided on a surface of the base film, and a reflectance control layer provided on a surface of the hard coat layer, in which the reflectance control layer has a thickness variation of 10% or less, and the base film, the hard coat layer, and the reflectance control layer have a surface hardness increasing in this order.

1 Claim, 6 Drawing Sheets

OPTICAL FUNCTIONAL RESIN PANEL HAVING LAYERS OF INCREASING SURFACE HARDNESS

BACKGROUND

1. Technical Field

The present disclosure relates to an optical functional resin panel having a high surface hardness and a uniform and even antireflection performance in a transparent resin cover lens placed on a display surface for in-vehicle use, and a method for manufacturing the same.

2. Description of the Related Art

There are devices that use liquid crystal displays to display information such as navigation, audio, entertainment and speed meters in cars. With the development of in-vehicle displays, the number of displays to be mounted and the arrangement in design have been diversifying. Meanwhile, due to design requirements, it has also been requested that a display be placed at the top of the cockpit at an angle at which sunlight is allowed to enter a surface of the display directly from the window section of the car, when a shade cover to prevent sunlight from entering the display is unwanted. However, when sunlight is reflected on the surface of the display and enters the eyes of the passengers, the screen becomes difficult to see. Therefore, in order to improve the visibility of the screen, it is necessary to reduce the surface reflectance.

Furthermore, due to design requirements, it has also been requested that a member covering the display has a free curved surface design in order to achieve a sense of unity and seamlessness with the interior in the vehicle. Therefore, an optical functional resin panel having a free curved surface shape and a low surface reflectance has been desired.

The display has also been required to have an optical functional resin panel having a touch panel function so that the screen can be operated. Since it is touched by a human hand for operation, when fingerprints or stains are attached, they are rubbed with a cloth or the like for wiping. The surface of the optical functional resin panel is also required to have a hard coat function having high hardness and scratch resistance so as not to be scratched during operation or wiping.

Figure 2:
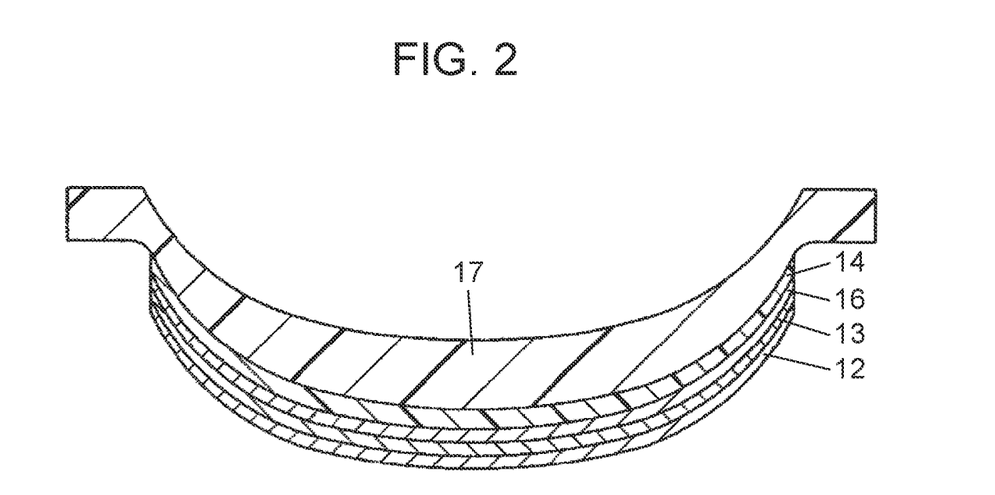
FIG. 2 is a cross-sectional view showing a state in which a conventional antireflection film described in Japanese Patent Unexamined Publication No. 2006-48026 is applied to a transfer target having a curved surface.

As a conventional method for manufacturing an optical functional resin panel, there is a manufacture method by a heat transfer method or an in-mold molding transfer method using an antireflection film for transfer (see, for example, Japanese Unexamined Patent Publication No. 2006-48026). FIG. 2 is a diagram showing a structure of a conventional optical functional resin panel described in Japanese Unexamined Patent Publication No. 2006-48026.

In FIG. 2, low refractive index layer 12, high refractive index layer 13, medium refractive index layer 16, and layer 14 having a hard coat property and a heat adhesive property are formed on resin molded article 17. An optical functional resin panel is manufactured by coating and forming low refractive index layer 12, high refractive index layer 13, medium refractive index layer 16, and layer 14 having a hard coat property and a heat adhesive property formed on a support film on a resin molded article having a curved surface made of an acrylic resin plate, and then transferring an optical function and a high hardness function to the resin molded article.

As a conventional method for manufacturing an optical functional resin panel, there is also a manufacture method using an insert molding method (see, for example, Japanese Unexamined Patent Publication No. 2016-20049).

In the insert molding method, a hard coat layer, a high refractive index layer, and a low refractive index layer are laminated in this order on one surface of a thermoplastic transparent base film to form an antireflection film for insert molding. The polycarbonate layer side of the obtained antireflection film for insert molding is held in a cavity in an injection molding mold so as to be brought into contact with a molten resin, and the molten polycarbonate resin is injected into the mold and cooled to manufacture a resin molded article. Through the insert molding fusion method in which the film is fused at the same time as molding, a resin molded article having an antireflection function on the surface is manufactured by fusing an antireflection film.

As a method of forming a hard coat layer, a high refractive index layer, and a low refractive index layer on a transparent base film, there is a method of forming by curing and drying each layer using wet coating. Each layer is formed to be uniform with a specified thickness. In particular, in order to achieve low reflectance, the thicknesses of the high refractive index layer and the low refractive index layer are required to be highly uniform. When the thickness changes, the wavelength of the light that reduces the reflectance via optical interference changes. Therefore, in order to make the color of the reflected light uniform, the thickness of the high refractive index layer and the low refractive index layer needs to be uniform.

There is also a method of imparting a low reflection function to the molded article later. The method may include, for example, scattering a low-refractive-index material and a high-refractive index material of an inorganic metal by sputtering to form a thin layer on the surface of the molded article, thereby imparting a low reflection function to the surface of the molded article.

SUMMARY

An optical functional resin panel according to one aspect of the present disclosure includes: an injection molding resin; a base film provided on a surface of the injection molding resin; a hard coat layer that is ultraviolet curable and provided on a surface of the base film; and a reflectance control layer provided on a surface of the hard coat layer, in which the reflectance control layer has a thickness variation of 10% or less, and the base film, the hard coat layer, and the reflectance control layer have a surface hardness increasing in this order.

A method for manufacturing an optical functional resin panel according to one aspect of the present disclosure includes: a step of shaping a film for insert molding including a first hard coat layer into a three-dimensional shape, the first hard coat layer being semi-cured ultraviolet curable; a step of integrating the film for insert molding with an injection molding resin by insert molding; a step of three-dimensionally applying and forming, after the insert molding, a reflectance control layer formed of an ultraviolet curable resin material onto a surface of the first hard coat layer; and a step of simultaneously curing the first hard coat layer and the reflectance control layer.

A method for manufacturing an optical functional resin panel according to another aspect of the present disclosure includes: a step of shaping a film for insert molding including a first hard coat layer into a three-dimensional shape, the first hard coat layer being semi-cured ultraviolet curable; a step of three-dimensionally applying and forming, after the shaping, a reflectance control layer formed of an ultraviolet curable resin material onto a surface of the first hard coat layer; a step of curing the first hard coat layer and the reflectance control layer by ultraviolet irradiation; and a step of integrating the film for insert molding with an injection molding resin by insert molding.

DETAILED DESCRIPTIONS

When a function is imparted to a surface of a resin molded article having a curved surface shape by using an antireflection film for transfer disclosed in Japanese Unexamined Patent Publication No. 2006-48026 and an antireflection film for insert molding disclosed in Japanese Unexamined Patent Publication No. 2016-20049, the film is deformed in conformance with the curved surface shape. In this case, it is necessary to stretch or bend and deform each layer of the film. Therefore, when the hardness of a hard coat layer is increased too much, the hard coat layer is broken without being stretched, so that there is a problem in that the hardness of the hard coat layer cannot be increased greatly.

It is also conceivable to use an aftercure type hard coat material for cracking during elongation deformation, and to make it easy to stretch during stretching deformation to solve cracking. However, when resin materials with a hard coat property forming the hard coat layer, the low refractive index layer, and the high refractive index layer are all formed of an aftercure type resin material, the problem of moldability is solved, but basically the resin is formed to have stretching and deformability. Therefore, there is a problem in that high hardness cannot be obtained as in the case of a precure type hard coat material even when UV irradiation is performed after molding to increase the hardness.

In the low refractive index layer and the high refractive index layer, when the layer is stretched in conformance with the curved surface shape, the thickness of the layer changes, so that the wavelength at which the reflectance decreases changes. Therefore, the reflection color changes depending on the site of the molded article, and color unevenness of the reflection color occurs, which causes a problem in that a high-quality optical functional resin panel cannot be provided.

There is also a method of imparting a low reflection function later to a molded article shape having a curved surface shape, but in a method such as sputtering, the distance between the sputter target site and the molded article site changes in a three-dimensional shape thereof. Therefore, there is a problem in that it is difficult to form a layer having a uniform layer thickness and a low reflection function, as the thicknesses of the low refractive index layer and the high refractive index layer formed by sputtering vary.

The present disclosure solves the above-mentioned conventional problems, and an object thereof is to provide an optical functional resin panel having a high surface hardness and a uniform low reflectance surface function in a shape in which a resin molded article has a three-dimensional curved surface, and a method for manufacturing the same.

An optical functional resin panel according to a first aspect includes: an injection molding resin; a base film provided on a surface of the injection molding resin; an ultraviolet curable hard coat layer provided on a surface of the base film; and a reflectance control layer provided on a surface of the hard coat layer, in which the reflectance control layer has a thickness variation of 10% or less, and the base film, the hard coat layer, and the reflectance control layer have a surface hardness increasing in this order.

Here, the thickness variation of the reflectance control layer is represented by a numerical value obtained by dividing the thickness difference between the maximum film thickness site and the minimum film thickness site of the reflectance control layer by the average film thickness of the reflectance control layer.

A method for manufacturing an optical functional resin panel according to a second aspect of the present disclosure includes: a step of shaping a film for insert molding including a semi-cured ultraviolet curable first hard coat layer into a three-dimensional shape; a step of integrating the film for insert molding with an injection molding resin by insert molding; a step of three-dimensionally applying and forming, after the insert molding, a reflectance control layer formed of an ultraviolet curable resin material onto a surface of the first hard coat layer; and a step of simultaneously curing the first hard coat layer and the reflectance control layer.

A method for manufacturing an optical functional resin panel according to a third aspect of the present disclosure may be the method according to the second aspect, which further includes: a step of three-dimensionally applying and forming, after integrating the film for insert molding with the injection molding resin by the insert molding, a material of an ultraviolet curable second hard coat layer having a surface hardness in a completely cured state higher than a surface hardness of a material of the first hard coat layer onto the surface of the first hard coat layer, in which the step of applying and forming the reflectance control layer is performed by three-dimensionally applying and forming the reflectance control layer onto a surface of the second hard coat layer after the step of three-dimensionally applying and forming the material of the second hard coat layer, and in the step of simultaneously curing the first hard coat layer and the reflectance control layer, the first hard coat layer of the film for insert molding, the applied second hard coat layer, and the reflectance control layer are simultaneously cured.

A method for manufacturing an optical functional resin panel according to a fourth aspect of the present disclosure includes: a step of shaping a film for insert molding including a semi-cured ultraviolet curable first hard coat layer into a three-dimensional shape; a step of three-dimensionally applying and forming, after the shaping, a reflectance control layer formed of an ultraviolet curable resin material onto a surface of the first hard coat layer; a step of curing the first hard coat layer and the reflectance control layer by ultraviolet irradiation; and a step of integrating the film for insert molding with an injection molding resin by insert molding.

A method for manufacturing an optical functional resin panel according to a fifth aspect of the present disclosure may be the method according to the fourth aspect, which further includes: a step of three-dimensionally applying and forming, after the step of shaping the film for insert molding into the three-dimensional shape, a material of an ultraviolet curable second hard coat layer using a material having a surface hardness higher than a surface hardness of a material of the first hard coat layer onto the surface of the first hard coat layer, in which the step of applying and forming the reflectance control layer is performed by three-dimensionally applying and forming the reflectance control layer onto a surface of the second hard coat layer after the step of three-dimensionally applying and forming the material of the second hard coat layer, and in the step of curing the first hard coat layer and the reflectance control layer by ultraviolet irradiation, the first hard coat layer, the applied second hard coat layer, and the reflectance control layer are simultaneously cured by ultraviolet irradiation.

A method for manufacturing an optical functional resin panel according to a sixth aspect of the present disclosure may be the method according to any one of the second to fifth aspects, in which the ultraviolet curable resin material contained in the reflectance control layer has a surface hardness higher than a surface hardness of an ultraviolet curable resin material contained in the ultraviolet curable first hard coat layer, and the ultraviolet curable resin material contained in the reflectance control layer has a breaking elongation rate lower than a breaking elongation rate of the ultraviolet curable resin material contained in the ultraviolet curable first hard coat layer.

A method for manufacturing an optical functional resin panel according to a seventh aspect of the present disclosure may be the method according to the second or fourth aspect, which further includes: a step of curing the first hard coat layer in a semi-cured state to form the film for insert molding so that unreacted reactive groups remain on the surface of the ultraviolet curable first hard coat layer, in which in the step of curing the first hard coat layer and the reflectance control layer, the first hard coat layer and the reflectance control layer are cured and adhered by ultraviolet irradiation so that reactive groups of the ultraviolet curable resin material contained in the reflectance control layer and the unreacted reactive groups of the first hard coat layer simultaneously react with each other.

With the above configuration, it is possible to provide an optical functional resin panel having a high surface hardness and a uniform low reflectance surface function in a shape in which a resin molded article has a three-dimensional curved surface, having high uniformity in the wavelength of low reflection color regardless of the shape or the site of the resin molded article, and having high appearance quality, and a method for manufacturing the same.

That is, even when a resin molded article has a three-dimensional shape, the optical functional resin panel according to the present disclosure can have a high surface hardness and a uniform low reflectance surface function with respect to the three-dimensional surface shape.

Hereinafter, the optical functional resin panel according to the exemplary embodiments will be described with reference to the accompanying drawings. In the drawings, substantially the same members are designated by the same reference numerals.

First Exemplary Embodiment

Figure 1:
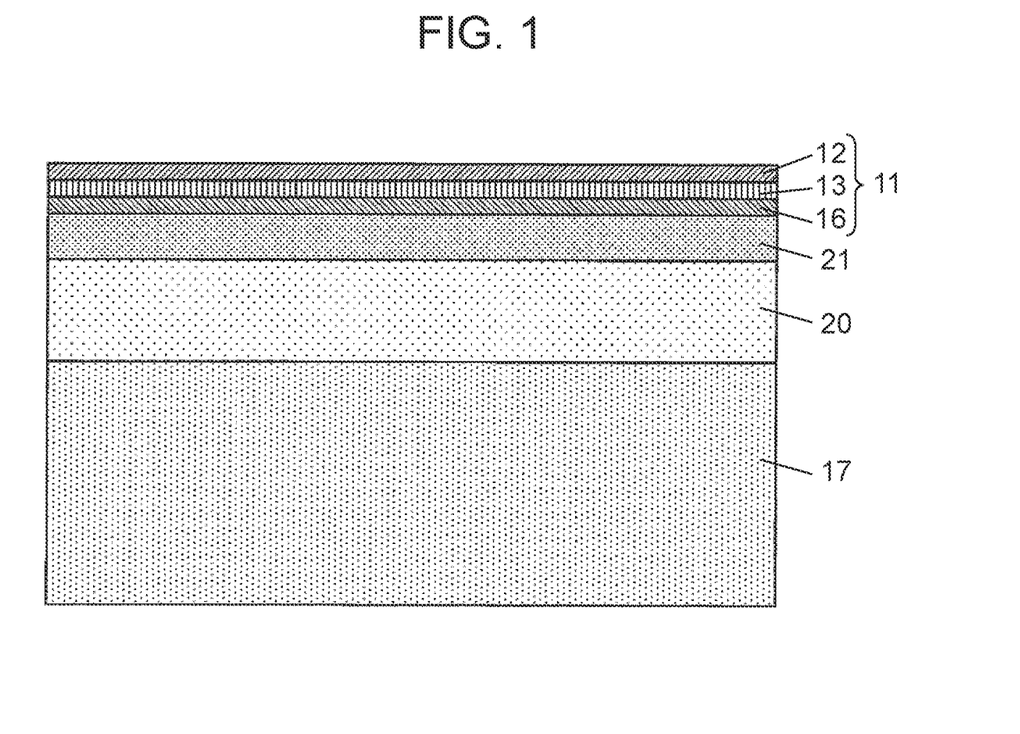
FIG. 1 is a cross-sectional view showing a structure of an optical functional resin panel according to a first exemplary embodiment.

FIG. 1 is a cross-sectional view showing a structure of an optical functional resin panel according to a first exemplary embodiment. In FIG. 1, the same reference numerals are used for the same components as those in FIG. 2, and the description thereof will be omitted.

In FIG. 1, the optical functional resin panel includes, on a surface of injection molding resin 17, base film 20 with hard coat layer 21 formed thereon, and reflectance control layer 11 formed on a surface of hard coat layer 21. Reflectance control layer 11 includes medium refractive index layer 16, high refractive index layer 13, and low refractive index layer 12 in this order from hard coat layer 21 to the surface side.

That is, even when a resin molded article has a three-dimensional shape, the optical functional resin panel according to the first exemplary embodiment can have a high surface hardness and a uniform low reflectance surface function with respect to the three-dimensional surface shape. Furthermore, since the thickness of the reflectance control layer is formed to be constant regardless of the surface shape site, the uniformity of the reflection color is maintained. As a result, it is possible to provide a high-quality appearance surface without color unevenness.

FIGS. 3A to 3F show each step of the manufacturing method in the exemplary embodiment.

Figure 3A:
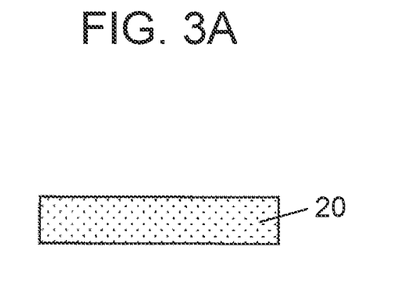
FIG. 3A is a diagram showing a base film manufacturing step in a method for manufacturing an optical functional resin panel according to the first exemplary embodiment.

(1) In a base film manufacturing step, base film 20 is manufactured (FIG. 3A).

Figure 3B:
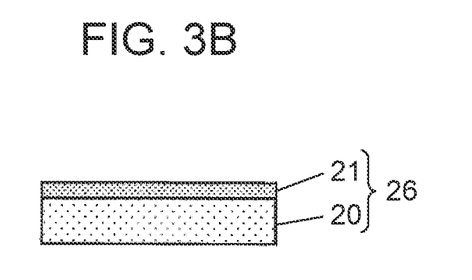
FIG. 3B is a diagram showing a film for insert molding manufacturing step in the method for manufacturing an optical functional resin panel according to the first exemplary embodiment.

(2) Next, in a film for insert molding manufacturing step, hard coat layer 21 is formed on base film 20 to manufacture film for insert molding 26 (FIG. 3B).

Figure 3C:
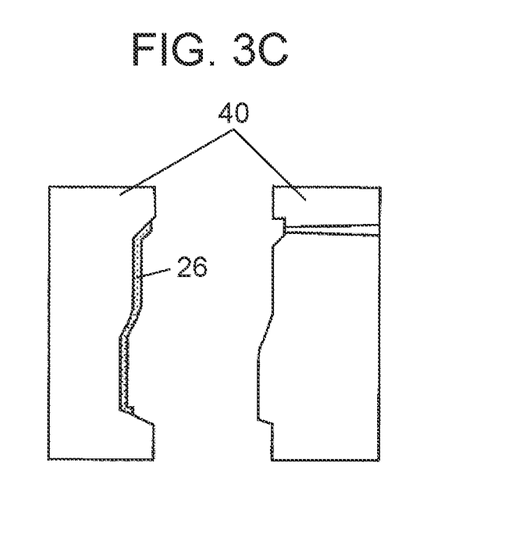
FIG. 3C is a diagram showing an insert molding step in the method for manufacturing an optical functional resin panel according to the first exemplary embodiment.

(3) Next, in an insert molding step, an insert molded article is manufactured using film for insert molding 26 and insert molding mold 40 (FIG. 3C).

Figure 3D:
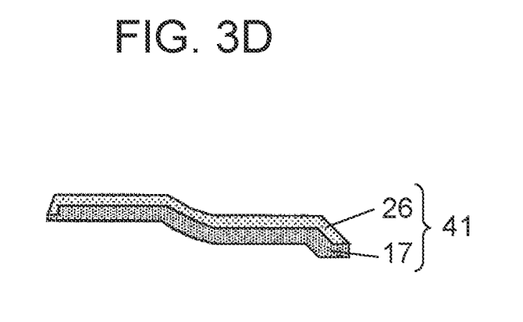
FIG. 3D is a diagram showing an insert molded article post-treatment step in the method for manufacturing an optical functional resin panel according to the first exemplary embodiment.

(4) In an insert molded article treatment step, post-treatment of insert-molded article 41 taken out from insert molding mold 40 is performed, and removal processing of an unnecessary gate portion and annealing of warpage correction are performed to complete insert molded article 41 (FIG. 3D). Insert molded article 41 includes film for insert molding 26 and injection molding resin 17.

Figure 3E:
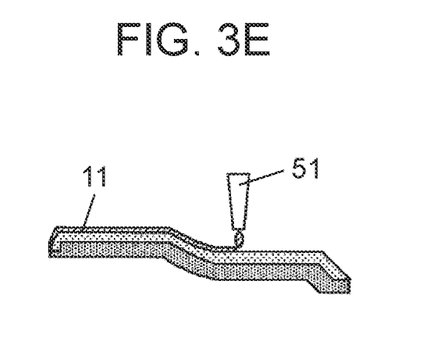
FIG. 3E is a diagram showing a step of providing a reflectance control layer on an insert molded article in the method for manufacturing an optical functional resin panel according to the first exemplary embodiment.
Figure 3F:
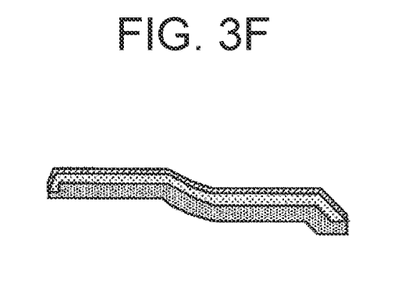
FIG. 3F is a diagram showing a structure of an optical functional resin panel obtained by the method for manufacturing an optical functional resin panel according to the first exemplary embodiment.

(5) In a reflectance control layer forming step, reflectance control layer 11 is formed on a surface of film for insert molding 26 by using application device 51 to manufacture an optical functional resin panel (FIG. 3E).

Details of each step are described below.

Base Film Manufacturing Step and Film for Insert Molding Manufacturing Step

Figure 4:
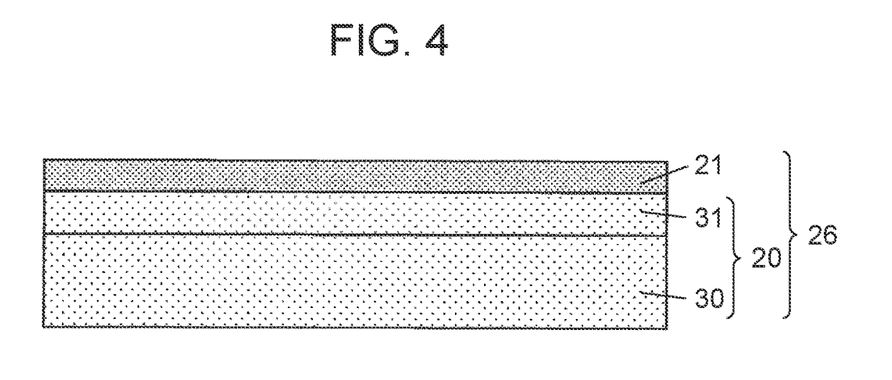
FIG. 4 is a cross-sectional view showing a structure of a film for insert molding according to the first exemplary embodiment.

FIG. 4 is a cross-sectional view showing a structure of film for insert molding 26 according to the first exemplary embodiment. In FIG. 4, film for insert molding 26 formed on the surface of an injection molding resin has a structure in which a hard coat material is applied and formed on the surface of base film 20 having a two-layer structure formed by extruding polycarbonate resin layer 30 and acrylic resin layer 31 to form hard coat layer 21.

Polycarbonate resin layer 30 is a base layer and has a thickness of 50 µm to 300 µm. The thickness of acrylic resin layer 31 is 10 µm to 200 µm. Although the base layer made of polycarbonate resin and the injection molding resin adhere to each other during insert molding, an adhesive layer may be formed between the injection molding resin and polycarbonate resin layer 30 which is the base layer in order to improve the adhesion therebetween. By arranging polycarbonate resin layer 30 of base film 20 and the polycarbonate resin of the injection molding resin with the same resin material, the difference of thermal shrinkage during molding and thermal shrinkage after molding is eliminated, so that a molded article excellent in warpage and dimensional stability can be constituted.

Since acrylic resin layer 31 is disposed on the surface side of the molded article and has a higher resin hardness than polycarbonate resin layer 30, it is a layer necessary for increasing the surface hardness of the molded article. Although it is possible to increase the surface hardness by increasing the thickness of this layer, it is not desirable to set the layer too thick from the viewpoint of impact resistance because the acrylic resin has a property of being easily cracked by impact. Therefore, acrylic resin layer 31 is formed to have a thickness thinner than the thickness of polycarbonate resin layer 30.

Film for insert molding 26 is preferably formed of base film 20 having a two-layer structure using polycarbonate resin layer 30 and acrylic resin layer 31, but is not limited to thereto. For example, if the specification is acceptable even if the surface hardness is low to some extent, a film of a polycarbonate resin layer alone may be used to simplify the structure and to reduce costs, or if the structure does not cause warpage, a PET film may be used.

Hard coat layer 21 is formed on base film 20 to form film for insert molding 26 (FIG. 3B). Hard coat layer 21 is formed by coating, drying, and curing a material containing an ultraviolet curable acrylic resin and a silica material as components. The coating is performed using a gravure coat, but may also be formed by using a gravure offset, a die coat, a reverse coat, or the like. At this time, hard coat layer 21 is dried and cured so as not to generate tack on the surface, but it is required to be formed in a state of being stretchable so as not to generate crack even when the hard coat layer is stretched and deformed in the shaping step for stretching and deforming in the subsequent step or in insert molding.

Therefore, it is necessary to set the thickness and cured state of hard coat layer 21, and the coating is performed so that the thickness is 5 µm or more and 20 µm or less, and the intensity and time of the ultraviolet rays to be irradiated in curing are adjusted to set the integrated light quantity so that the hard coat layer is not cured completely. Hard coat layer 21 was formed by setting the integrated light quantity based on the stretchability required in the subsequent step. By forming by the coating method, the thickness of the hard coat layer can be increased. The larger the thickness of hard coat layer 21, the higher the surface hardness can be. However, from the viewpoint of the amount of material used and the material cost, it is desirable to set the optimum thickness with respect to the required surface hardness specifications.

Figure 5:
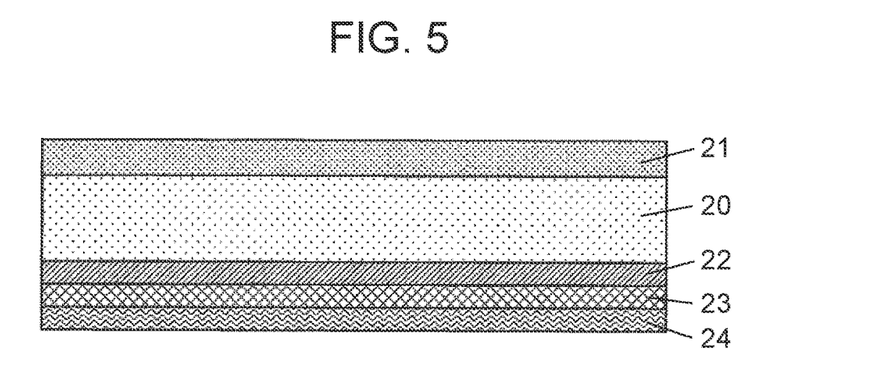
FIG. 5 is a cross-sectional view showing a structure of the film for insert molding including a decorative layer according to the first exemplary embodiment.

FIG. 5 is a cross-sectional view showing a cross-section of a structure of film for insert molding 26 including a decorative layer. On the opposite surface of base film 20 that does not form hard coat layer 21, adhesive layer 24 may be formed in order to improve the adhesion to the injection molding resin during insert molding. Primer layer 22 may also be formed between base film 20 and adhesive layer 24 in order to improve the adhesion between base film 20 and adhesive layer 24. A design portion may also be printed on base film 20, and in that case, decorative layer 23 is formed by printing on the opposite surface on which hard coat layer 21 is not formed on base film 20. Silk screen printing, gravure printing, offset printing, or inkjet printing may be used for printing decorative layer 23. Generally, as a design for a display, a black frame on the screen and characters and logos of operation functions are often printed.

In performing insert molding, it is necessary to shape film for insert molding 26 having hard coat layer 21 formed on base film 20 with respect to the shape of the molded article. In a case where the molded article has a flat shape, the film having a flat shape may be inserted into an insert mold using as it is, and injection molded to form a molded article. On the other hand, in a case where the molded article has a shape having a curved surface, film for insert molding 26 needs to be shaped to fit the molded article shape.

Film for insert molding 26 is shaped by using a vacuum forming method and a jig for deforming the film into a predetermined molded article shape to form a shape. The method for shaping film for insert molding 26 is not limited to the vacuum forming method, and a vacuum pressure air forming method or a pressing method may also be used. In film for insert molding 26, since hard coat layer 21 is a hard coat layer in a semi-cured state, it can be deformed into a predetermined molded article shape without causing cracks. Film for insert molding 26 after shaping is trimmed so as to leave only necessary sites of the film, so that the film can be inserted into the insert molding mold.

Insert Molding Step

Film for insert molding 26 after shaping and trimming is inserted and placed into insert molding mold 40, and injection molded to form a molded article (FIG. 3C). As the material of the injection molding resin, a transparent or smoke-based polycarbonate resin having controlled light transmittance may be used. When used for in-vehicle applications, impact resistance is important, so polycarbonate resin with excellent physical properties is often used but PET resin, acrylic resin, and other engineering plastics may also be used as a resin having transparency and formed by injection molding. The molded article can be formed with a thickness of 1 mm to 5 mm in consideration of fluidity. Furthermore, from the characteristics of the optical resin panel, the transparency of the display, the impact resistance of the molded article, and the rigidity, the thickness is desirably in the range of 1.5 mm to 3 mm. For fluidity, the insert molding mold may also use compression molding. In compression molding, the resin can be filled in a state in which the space in the compression section is open during resin flow, thus improving the resin fluidity and allowing the compression section to be pushed into the resin during resin filling to be molded to have a predetermined thickness.

Figure 6:
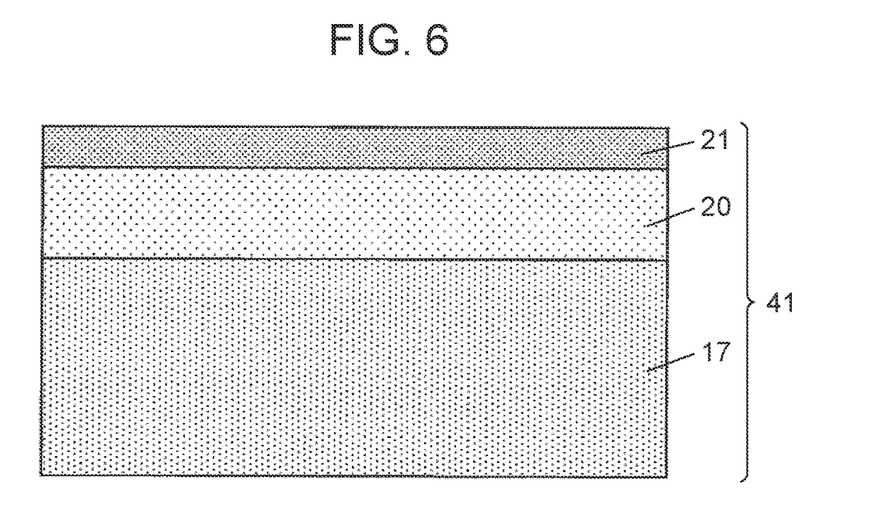
FIG. 6 is a cross-sectional view showing a structure of a flat portion of the optical functional resin panel immediately after insert molding in the first exemplary embodiment.

FIG. 6 is a diagram showing a state of a flat portion of the optical functional resin panel, which is insert molded article 41 of the optical functional resin panel molded in insert molding mold 40 and taken out from the mold. The optical functional resin panel which is insert molded article 41 has base film 20 adhering to the surface of injection molded polycarbonate resin 17, and hard coat layer 21 formed on base film 20.

In insert molding mold 40, insert molded article 41 of the optical functional resin panel is usually molded with a side gate structure, so that a gate portion that may hinder the subsequent step is removed by cutting. The gate portion is removed by using a press cut, a cutting process, or an ultrasonic cutter method.

Figure 7:
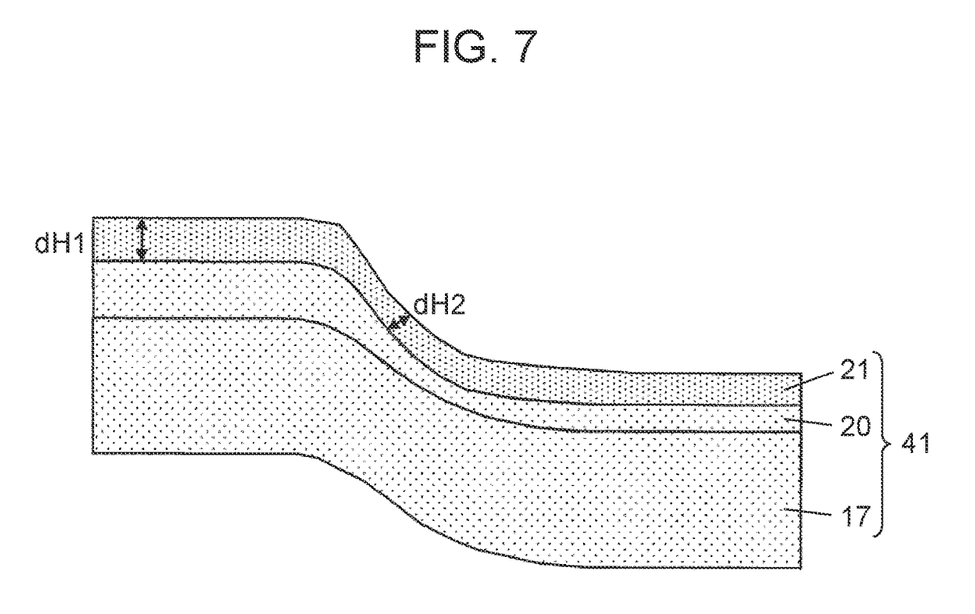
FIG. 7 is a cross-sectional view showing a structure of a curved surface portion of the optical functional resin panel immediately after insert molding in the first exemplary embodiment.

FIG. 7 is a diagram showing a cross-sectional view of a curved surface shaped site of the optical resin panel which is insert molded article 41. In the curved surface shape of insert molded article 41, base film 20 and hard coat layer 21 are in a state of being stretched into a curved surface shape by the resin pressure of shaping and injection molding. Therefore, base film 20 and hard coat layer 21 are formed in a state where thickness dH2 of the curved surface portion is smaller than thickness dH1 of the not stretched flat portion by the amount of stretching.

Reflectance Control Layer Forming Step

Reflectance control layer 11 is formed on insert molded article 41 of the optical functional resin panel (FIG. 3E). When reflectance control layer 11 is formed, insert molded article 41 usually has a warpage or a dimensional error due to the influence of molding shrinkage in the state immediately after molding. When the shape of the molded article is not stabilized in forming reflectance control layer 11, the formation of reflectance control layer 11 may not be stable and formation of the molded article with high accuracy may not be possible, and warpage and dimensions are thus stabilized by annealing the molded article. For example, the molded article may be placed in a constant temperature bath and allowed to stand at a temperature equal to or higher than the glass transition temperature of the polycarbonate resin to stabilize warpage and dimensions. Depending on the shape of the molded article, a jig may be used in which the surface on which the molded article is to be placed is in conformance with the shape of the molded article. In the first exemplary embodiment, a jig corresponding to the curved surface shape is placed in a constant temperature bath and allowed to stand at 120° C. for 2 hours to stabilize the warpage and dimensions. However, in a case where dimensional stabilization is not necessary depending on the shape and molding state of insert molded article 41, annealing is not required.

Reflectance control layer 11 is formed of, for example, a material for adjusting the refractive index layer and an ultraviolet curable resin, and is formed by laminating medium refractive index layer 16, high refractive index layer 13, and low refractive index layer 12. It is preferable that the refractive index of low refractive index layer 12 be 1.33 or more and 1.40 or less, the refractive index of medium refractive index layer 16 be 1.42 or more and 1.48 or less, and the refractive index of high refractive index layer 13 be 1.50 or more and 1.65 or less. The film thickness is designed and formed with respect to the refractive index of the material so as to have predetermined reflectance characteristics in the range of 100 nm or more and 250 nm or less. Reflectance control layer 11 may be formed of only low refractive index layer 12, or only low refractive index layer 12 and high refractive index layer 13, depending on the predetermined reflectance.

The reflectance characteristics of reflectance control layer 11 are set by the refractive index and the film thickness of the material with respect to the wavelength of the reflected light. Therefore, when the film thickness is changed even in the refractive index of the same material, the reflectance of reflected light to the wavelength changes, and thus the reflection color changes. Therefore, when the film thickness varies, color unevenness of the reflection color occurs. Therefore, it is necessary to make the film thickness uniform in order to form reflectance control layer 11 with a uniform color.

Reflectance control layer 11 is formed by application to a surface of insert molded article 41 of the optical functional resin panel by application device 51. Hard coat layer 21 formed on base film 20 adhered to insert molded article 41 is maintained in a semi-cured state. In this state, unreacted groups of the ultraviolet curable resin remain on the surface of hard coat layer 21. In that state, when reflectance control layer 11 is applied to the surface of hard coat layer 21 and then cured by ultraviolet irradiation, the unreacted groups of the ultraviolet curable resin of hard coat layer 21 and the reactive groups of the ultraviolet curable resin of reflectance control layer 11 can simultaneously react to form a strong adhesion state.

In the flat portion and the curved surface portion of insert molded article 41, in order to apply and form uniform reflectance control layer 11 on the surface of hard coat layer 21, the application material of reflectance control layer 11 is applied in a uniform amount per area by lowering the viscosity and enhancing the wetting and spreading state. As a result, uniform reflectance control layer 11 can be formed on the surface.

In the formation of reflectance control layer 11, in a case where a predetermined reflectance is 1% or more and 2% or less with respect to the wavelength of the reflected light, reflectance control layer 11 is formed to have a single-layer structure in which only low refractive index layer 12 is applied and formed. In a case where a predetermined reflectance of 0.5% or more and 1% or less is required, reflectance control layer 11 is formed to have a two-layer structure in which low refractive index layer 12 is applied and formed after high refractive index layer 13 is applied and formed. In a case where low reflection characteristics of 0.5% or more and 1% or less are required in a wide wavelength width with respect to the wavelength of the reflected light, reflectance control layer 11 is formed to have a three-layer structure in which high refractive index layer 13 is formed after medium refractive index layer 16 is applied and formed and then low refractive index layer 12 is applied and formed.

Since ultraviolet curable resin forming reflectance control layer 11 is formed by application and is not required to have stretchability, so that the surface hardness of ultraviolet-curable resin forming hard coat layer 21 formed on base film 20 can be set higher and the stretchability at the elongation at break can be set lower than that of the ultraviolet-curable resin forming the hard coat layer. When the ultraviolet rays are irradiated and cured, by ultraviolet irradiation in a nitrogen purge environment, it is possible to prevent insufficient curing due to oxygen inhibition on the surface of the ultraviolet curable resin.

Figure 8:
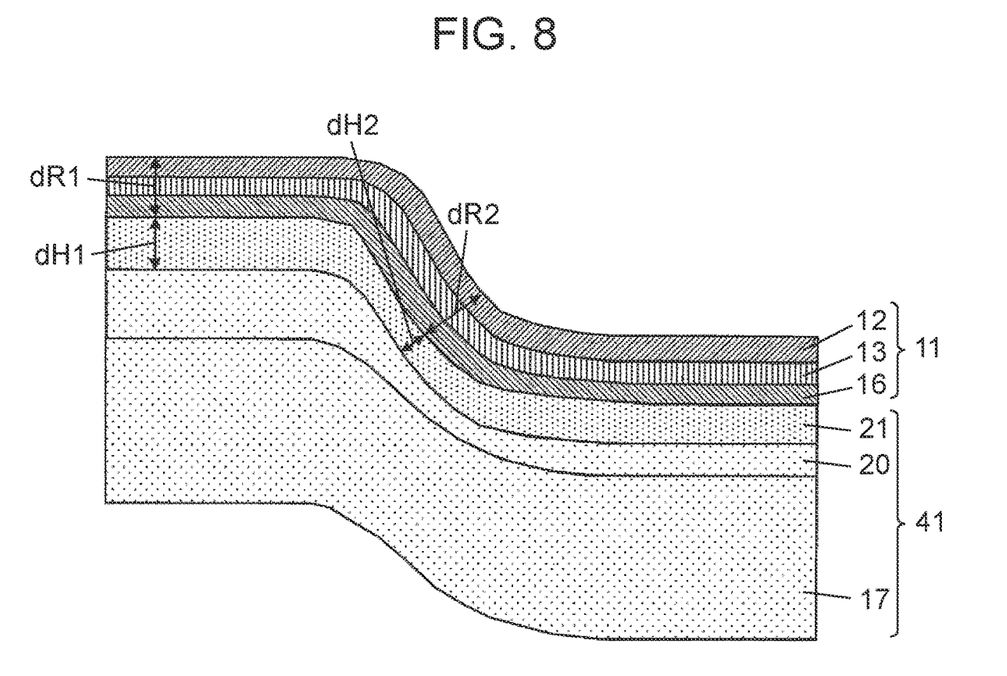
FIG. 8 is a cross-sectional view showing the structure of the curved surface portion of the optical functional resin panel according to the first exemplary embodiment.

FIG. 8 is a cross-sectional view showing the structure of the curved surface portion of the optical functional resin panel according to the first exemplary embodiment. In the curved surface portion, the surface of insert molded article 41 has thickness dH2 of the curved surface portion of hard coat layer 21, which is smaller than thickness dH1 of base film 20 and the flat portion of hard coat layer 21 formed on the surface of the base film, due to stretching deformation, so that dH1>dH2 is satisfied.

On the other hand, since reflectance control layer 11 is formed after insert molding, thickness dR1 of the flat portion and thickness dR2 of the curved surface portion are formed to have substantially uniform film thickness. When reflectance control layer 11 is formed to have a film thickness variation 10% or less, the difference in the wavelength with the lowest reflectance is about 20 nm, with little discomfort due to color unevenness. Furthermore, the thickness variation is more preferably 5% or less, as it is formed with almost no color unevenness.

Application device 51 for forming reflectance control layer 11 may be formed by a dipping, spraying, or inkjet method, but it is preferable to use an inkjet device capable of applying a curved surface in order to control the amount of application per area or a stable amount of application on a curved surface site.

In general, hardness and stretchability are contradictory characteristics. Therefore, in the optical functional resin panel according to the first exemplary embodiment, when the stretchability of base film 20 and hard coat layer 21 forming film for insert molding 26 is increased in order to improve the stretch followability in the curved surface shape, the surface hardness cannot be set high. Therefore, it is designed to increase the hardness of the ultraviolet curable resin material of reflectance control layer 11 formed after insert molding. That is, base film 20 adhering to injection molding resin 17 can be set to have the highest stretchability and the lowest hardness, hard coat layer 21 in a semi-cured state can be set to have the next highest stretchability and the next lowest hardness, and reflectance control layer 11 formed by the application method can be set to have the lowest stretchability and the highest hardness.

Specifically, when the stretchability is evaluated in terms of elongation at break defined as elongation rate "A %=ΔL (length at which the elongation at break)÷L (length before evaluation)", the stretchability at the elongation at break of base film 20 is not less than 50% and not more than 150%, and the surface hardness is not less than HB and not more than 2H. This surface hardness is based on the "Scratch hardness (pencil method)" described in Part 5 the mechanical property of film in the testing methods for paints of JIS K5400-5-4 (corresponding international standard: ISO/DIS 15184: 1996), and so-called "pencil hardness". For hard coat layer 21, a material of which a breaking elongation rate is 20% or more and 50% or less in a semi-cured state and a surface hardness is F or more and 2H or less, but of which a breaking elongation rate is 10% or more and 20% or less in a completely cured state and a surface hardness is 2H or more and 4H or less is used. For reflectance control layer 11, a material having a breaking elongation rate of 5% or more and 10% or less and a surface hardness of 4H or more and 6H or less after curing is used.

The optical functional resin panel according to the above-described exemplary embodiments and the conventional optical functional resin panel will be described in comparison with each other. First, in a case where the hard coat layer and the reflectance control layer are formed at the same time as in the related art, when the surface hardness is set as high as 4H or more, the stretchability at the elongation at break becomes as low as 20% or less. Moreover, the change in the thickness of the reflectance control layer is also reduced by about 20% near the stretchability limit value, which may cause color unevenness. On the other hand, the present embodiment solves the problem of being able to cope with a curved surface shape requiring stretchability of 20% or more with a surface hardness of 4 H or more and a thickness change of the reflectance control layer of 10% or less. When the surface hardness is set as high as 6H, in the related art, only a flat shape that requires almost no stretchability is allowed to be employed, but the first exemplary embodiment allows to employ a curved surface shape of which stretchability is 20% or more and 50% or less.

According to the optical functional resin panel according to the first exemplary embodiment, it is possible to provide an optical functional resin panel having a high surface hardness and a uniform low reflectance surface function in a shape in which a resin molded article has a three-dimensional curved surface, having high uniformity in the wavelength of low reflection color regardless of the shape or the site of the resin molded article, and having high appearance quality, and a method for manufacturing the same.

Second Exemplary Embodiment

Figure 9:
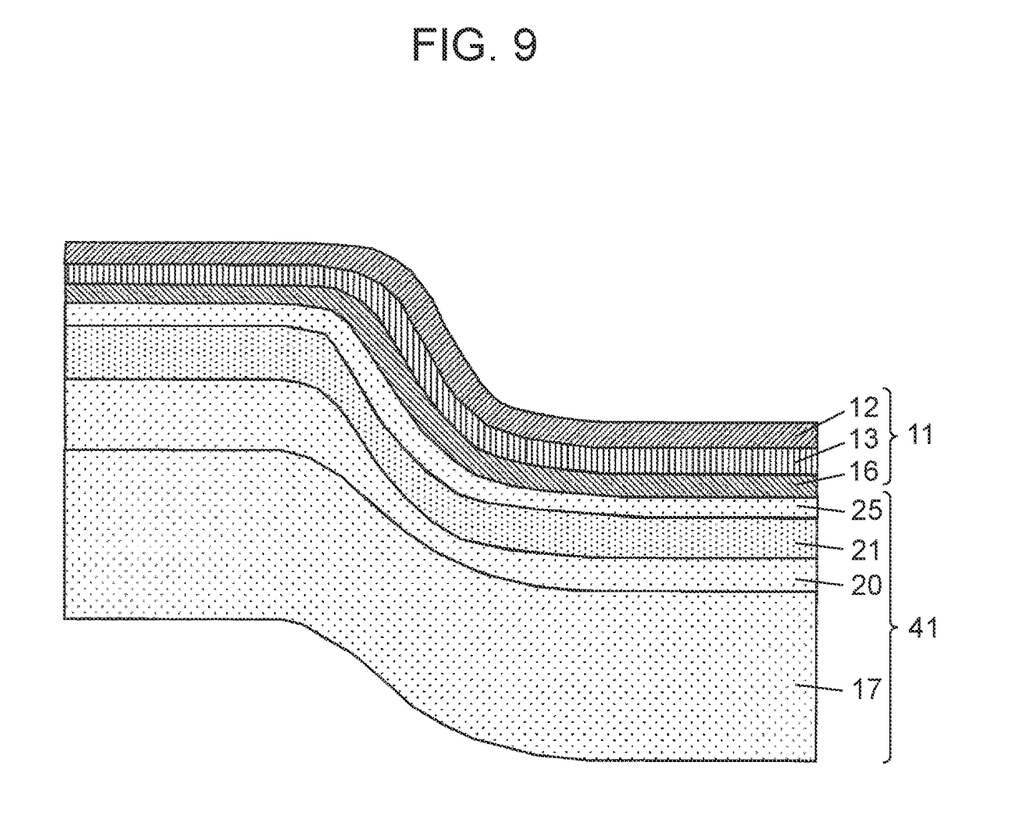
FIG. 9 is a cross-sectional view showing a structure of a curved surface portion of an optical functional resin panel according to a second exemplary embodiment.

FIG. 9 is a cross-sectional view showing a structure of an optical functional resin panel according to a second exemplary embodiment. In FIG. 9, the same reference numerals are used for the same components as those in FIGS. 1 and 3, and the description thereof will be omitted.

In FIG. 9, a surface of insert molded article 41 has base film 20 for insert molding and first hard coat layer 21 formed on a surface thereof. Reflectance control layer 11 is formed after forming second hard coat layer 25 formed of the hard coat material by applying on the surface of first hard coat layer 21.

Since the hard coat material of second hard coat layer 25 formed by application is formed by application, stretchability is not required. Therefore, the surface hardness of the hard coat material of second hard coat layer 25 can be set higher than the surface hardness of the ultraviolet curable resin of first hard coat layer 21 formed of the hard coat material formed on base film 20 for insert molding. Furthermore, the stretchability at the elongation at break can be set low. Thereby, the surface hardness of insert molded article 41 can be further increased. In the curved surface portion of insert molded article 41, second hard coat layer 25 is formed by applying on the surface of first hard coat layer 21 which has become thin due to stretching deformation, thereby preventing a decrease in surface hardness as well as realizing the high surface hardness by increasing the thickness of the hard coat layer.

The thickness of the entire hard coat layer can be increased by adding second hard coat layer 25 by application. Therefore, in order to achieve a predetermined surface hardness, the thickness of first hard coat layer 21 formed on base film 20 for insert molding, which requires stretchability, may be made thin in advance. The high surface hardness can be covered by second hard coat layer 25 formed by application. Therefore, the thickness of the two hard coat layers can be made smaller than that of the case where the hard coat layer is formed only by the film for insert molding, which is advantageous from the viewpoint of reducing the material for forming the hard coat layer.

As a method for forming second hard coat layer 25 by application, a dipping, spraying, or inkjet method can be used.

Since the following manufacturing method is the same as the manufacturing method described in the first exemplary embodiment, the description thereof will be omitted.

It should be noted that the present disclosure includes a suitable combination of any one of the various embodiments and/or embodiments described above, and the effects of each embodiment and/or embodiment can be achieved.

The optical functional resin panel according to the present disclosure has a high surface hardness and a uniform low reflectance surface function in a shape in which a resin molded article has a three-dimensional curved surface, has high uniformity in the wavelength of low reflection color regardless of the shape or the site of the resin molded article, and has high appearance quality. Therefore, the present disclosure can also be applied to a cover panel of an in-vehicle display, a display cover panel of an electronic product such as a tablet, a notebook personal computer, and a smartphone, a display cover panel for in-flight entertainment of an aircraft, an optical functional resin panel having an anti-reflection optical function and anti-scratch and anti-scratch surface hardness functions such as a cover panel of an operation display of an industrial machine, and the applications of the manufacturing method thereof.

What is claimed is:

1. An optical functional resin panel comprising:
   an injection molding resin;
   a base film provided on a surface of the injection molding resin;
   a hard coat layer that is ultraviolet curable and provided on a surface of the base film; and
   a reflectance control layer provided on a surface of the hard coat layer,
   wherein the reflectance control layer has a thickness variation of 10% or less, and
   the base film, the hard coat layer, and the reflectance control layer have a surface hardness increasing in this order.

* * * * *